United States Patent [19]

Tsuruoka et al.

[11] Patent Number: 4,469,615

[45] Date of Patent: Sep. 4, 1984

[54] WATER TREATING COMPOSITIONS

[75] Inventors: Setsuo Tsuruoka; Iehito Tasaka, both of Amagasaki; Yuji Kawamura, Inuyama; Shizuo Kimata, Nagoya; Tatsuki Wabiko, Takarazuka, all of Japan

[73] Assignees: Kohryu Industrial Co. Ltd., Osaka; Toagosei Chemical Industrial Co., Tokyo, both of Japan

[21] Appl. No.: 440,282

[22] Filed: Nov. 9, 1982

[30] Foreign Application Priority Data

Nov. 11, 1981 [JP] Japan .................. 56-179816

[51] Int. Cl.$^3$ .................. C02F 5/10; C23F 11/12
[52] U.S. Cl. ................... 252/180; 252/181; 252/392; 210/698; 210/701
[58] Field of Search .............. 252/180, 181, 309.1, 252/309.52; 210/698, 701

[56] References Cited

U.S. PATENT DOCUMENTS

| | | | |
|---|---|---|---|
| 3,699,048 | 10/1972 | Krueger et al. | 252/180 |
| 3,790,610 | 2/1974 | Lum et al. | 252/180 |
| 3,799,893 | 3/1974 | Quinlan | 252/180 |
| 3,832,301 | 8/1974 | Lazare et al. | 210/698 |
| 4,223,120 | 9/1980 | Kurowsky | 252/180 |
| 4,306,991 | 12/1981 | Hwa et al. | 252/180 |

*Primary Examiner*—John E. Kittle
*Assistant Examiner*—Robert A. Wax
*Attorney, Agent, or Firm*—Cooper, Dunham, Clark, Griffin & Moran

[57] ABSTRACT

A water treating composition comprising a water-soluble copolymer consisting of, as the components, (A) an addition reaction product of a glycidyl ether or glycidyl ester and an $\alpha,\beta$-ethylenically unsaturated carboxylic acid and (B) another vinyl monomer. In one embodiment, the water treating composition further comprises one or more conventional corrosion preventing/inhibiting agents.

15 Claims, No Drawings

WATER TREATING COMPOSITIONS

This invention relates to a water treating compoosition and more particularly to such a composition for use in the prevention and inhibition of corrosion, scale formation, sludge deposition, dirtying and the like caused on a metal surface in contact with various kinds of water typified by cooling water and recycling water. Further more particularly, it relates to such a composition for use in preventing and inhibiting corrosion, scale formation, sludge deposition, dirtying and the like caused on metal surfaces in contact with water of any kind mentioned above, the metal surfaces being illustrated by the heat conducting surfaces of industrial heat exchangers in the water cooling systems, boilers and seawater desalinators and the metal surfaces of other portions and their piping in various factories, and also by the metal surfaces of apparatuses and piping used in the water systems in iron and steel works.

Water supplied for use as cooling water and recycling water in the various industrial fields usually contains comparatively sparingly soluble inorganic salts dissolved and other substances suspended therein. The inorganic salts so dissolved are the carbonate, sulphate, silicate and the like of each of calcium and magnesium. Therefore, when the water so supplied is recycled and circulated for use, the dissolved inorganic salts and suspended substances in the water will gradually be concentrated as evaporation of the water proceeds whereby the comparatively sparingly soluble inorganic salts are deposited on, and attached to, the heat conducting surfaces and metal surfaces to form scale thereon. Further, suspensoids such as earth, clay and organic substances, which have been contained in supply water and transported therewith and have been transported to the supply water from the air, will stagnate and deposit on the portions of said apparatuses and piping at which the water flows slowly thereby causing sludge deposition, dirtying and scale formation.

In addition, recycling water will gradually raise its pH value as the content of inorganic salts dissolved therein increases, accompanied with evaporation of the water, whereby the metal surfaces in contact with the water increase in corrosion. Furthermore, since the concentration of oxygen dissolved in the water is not uniform at the surfaces of scale-formed portions, sludge-deposited portions and dirt-attached portions, an electrochemical oxygen concentration cell is formed on these portions thereby causing the acceleration of local corrosion of said portions.

Such water as mentioned above has recently come to be recycled over a long period of time from the viewpoint of economy and effective use of the water and, therefore, the recycled water will become high in concentration of said solid matter dissolved and suspended therein as compared with fresh supply water thereby rendering it possible to easily cause corrosion of the metal surfaces of apparatuses used, scale formation and sludge deposition (from the suspension) thereon. Thus, the recycled water will gradually be more undesirable to the metal surfaces and heat conducting surfaces. For this reason, it has recently caused troubles very often particularly on the apparatuses and may, in some cases, cause such serious accidents that the operation of the apparatus must be suspended.

There have heretofore been reported methods for the prevention and inhibition of troubles such as corrosion and scale formation by the use of a water treating composition. The water treating agents used in these conventional methods comprise (1) at least one member selected from inorganic phosphates, oxycarbonates, amine salts, phosphonates, phosphoric esters, polysaccharides and polyvalent metal salts (these being hereinafter referred to as a "corrosion preventing/inhibiting agent") and (2) at least one water-soluble organic polymer such as polyacrylic acid and partly hydrolyzed polyacrylamide. The compounds (1) and (2) may be used in combination. Such conventional methods are known from, for example, Japanese Pat. Appln. Laid-Open Gazette 51-146341, U.S. Pat. Nos. 4,029,577 and 4,209,398. These conventional methods comprising using the aforementioned water treating agents surely exhibit remarkable effects on the prevention and inhibition of corrosion, scale formation and sludge deposition in the water recycling systems.

However, conventional known water treating compositions containing no "corrosion preventing/inhibiting agent" but containing only organic polymers exhibit remarkable effects on the prevention and inhibition of scale formation and sludge deposition, while they do not exhibit any effects on the prevention and inhibition of corrosion.

Thus, the conventional known water treating compositions disclosed in the abovementioned Gazette and U.S. Patents must contain a phosphorus-containing "corrosion preventing/inhibiting agent" to prevent and inhibit corrosion. When these conventional water treating compositions are added to the cooling water and recycling water as treating agents for preventing and inhibiting corrosion, scale formation and sludge deposition, it follows that these composition-added waters contain phosphorus. If these waters drained and discharged to lakes, swamps, rivers and oceans, the latter will be eutrophicated thereby disadvantageously causing environmental pollution and, in turn, harm to the public. Accordingly, water treating compositions and treating methods which do not raise problems as to secondary public harm and environmental pollution such as eutrophication, have recently been earnestly sought for. It is possible to use chromates, oxycarbonates and the like containing no phosphorus in order to prevent and inhibit corrosion, however, these compounds are disadvantageous in that they have strong toxicity or no sufficient effects.

The present inventors made intensive studies in an attempt to obtain a water treating composition which eliminates the above drawbacks and problems, does not contain the ingredients causing environmental pollution and prevents and inhibits corrosion, scale formation, sludge deposition and dirtying in water systems and which, more particularly, has preventive and inhibitive effects on corrosion, scale formation, sludge deposition and dirtying at a solid body surface and metal body surface each in contact with water and does substantially not raise any problems as to public harm and, as a result of their studies, they found that the following novel watersoluble copolymer used as the water treating composition of this invention eliminate the aforesaid drawbacks and will exhibit very excellent effects on the prevention and inhibition of corrosion, scale formation, sludge deposition, dirtying and the like.

The novel water-soluble copolymer used in this invention is a copolymer comprising, as the components, (1) an addition reaction product (hereinafter referred to as "monomer A") of a glycidyl ether or glycidyl ester and an α,β-ethylenically unsaturated carboxylic acid and (2) another vinyl monomer (hereinafter referred to as "monomer B"). More particularly, as mentioned above. The monomer A is an addition reaction product obtained by reacting a glycidyl ether or ester with an α,β-ethylenically unsaturated carboxylic acid by the use of a known method and it is typically represented by the following structural formula (when a glycidyl ether is used for addition reaction):

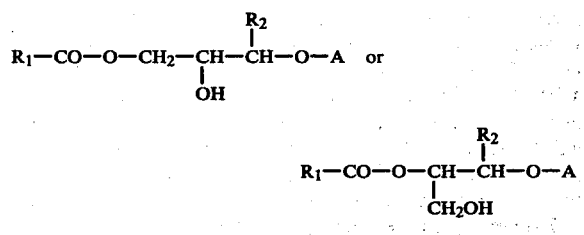

wherein A is an alkyl, aryl, cycloalkyl or acyl group, $R_1$ is the residue of an α,β-ethylenically unsaturated carboxylic acid used (the residue being the acid from which the carboxyl group or groups have been eliminated), and $R_2$ is —$CH_3$ group or H.

The α,β-ethylenically unsaturated carboxylic acids used for composing the addition reaction products, include acrylic, methacrylic, maleic and itaconic acids, acrylic and methacrylic acids being preferable; and the glycidyl ethers and esters used therefor include methylglycidyl ether, ethylglycidyl ether, butylglycidyl ether, 2-ethylhexylglycidyl ether, laurylglycidyl ether, butylmethaglycidyl ether, phenylglycidyl ether, phenylmethaglycidyl ether, arylglycidyl ether, acetic acid methaglycidyl ester, propionic acid glycidyl ester, benzoic acid glycidyl ester, lauric acid glycidyl ester and palmitic acid glycidyl ester, butylglycidyl ether and phenylglycidyl ether being preferable.

As an example of the addition reaction product, there will be shown hereunder a reaction product obtained by reacting phenylglycidyl ether as a glycidyl ether with acrylic acid as an α,β-ethylenically unsaturated carboxylic acid:

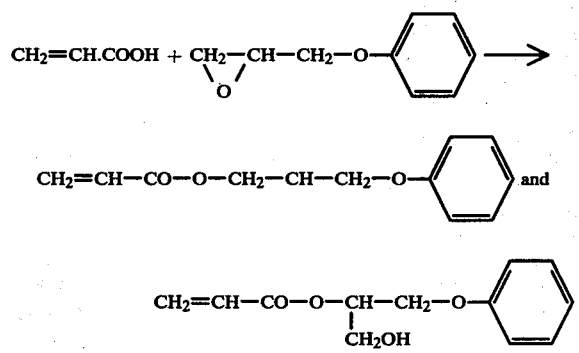

The above addition reaction may be carried out by a known method as described in Japanese Pat. Appln. Laid-Open Gazette 53-18637 and 49-128088, for example.

The monomer B used as a component of the water-soluble copolymer according to this invention, includes a generally known, unsaturated bond-containing vinyl monomer other than the A monomer. More specifically, the B monomer includes an α,β-ethylenically unsaturated carboxylic acid such as acrylic, methacrylic, maleic or itaconic acid; an acrylic acid ester such as methyl acrylate, butyl acrylate, lauryl acrylate, 2-hydroxyethyl acrylate or methoxyethyl acrylate; a methacrylic acid ester such as methyl methacrylate, ethylmethacrylate, 2-ethylhexyl methacrylate, hydroxyethyl methacrylate, ethoxyethyl methacrylate or dimethylaminoethyl methacrylate; an unsaturated dicarboxylic acid ester such as monomethyl itaconate, monomethyl maleinate or dibutyl maleinate; an unsaturated amide such as acrylamide, methacrylamide, N-methylmethacrylamide, N,N-dimethylacrylamide, butoxymethylacrylamide, N-methylolacrylamide or diacetoneacrylamide; a vinyl ester such as vinyl acetate, vinyl stearate or vinyl benzoate; an unsaturated nitrile such as acrylonitrile or methacrylonitrile; a vinyl aromatic compound such as styrene, α-methylstyrene, α-chlorostyrene, vinylnaphthalene, vinyltoluene or 2,4-dichlorostyrene; a vinyl ether such as methyl vinyl ether, butyl vinyl ether or dichloroethyl vinyl ether; a linear olefin, cyclic olefin or conjugated diene such as butadiene, isobutylene, ethylene, propylene, n-buten, isobutene, n-pentene, isoprene, 2-methyl-1-butene, n-hexene, dimethyl-1-pentene, 2-ethyl-1-butene, cyclobutene, cyclopentene, cyclohexene or cyclopentadiene; a sulfo group-containing monomer such as vinylsulfonic acid, allylsulfonic acid, methallylsulfonic acid, styrenesulfonic acid, 2-acrylamide-2-methylpropanesulfonic acid or methacrylateethylsulfonic acid; a vinyl compound such as vinyl chloride, vinylidene chloride, vinylpyridine or vinylpyrrolidone; a monoglycidyl derivative such as glycidyl acrylate, glycidyl methacrylate, 2-ethylhexylglycidyl ether, laurylglycidyl ether or allylglycidyl ether; a polyethylene glycol derivative such as polyethylene glycol monomethacrylate, polypropylene glycol monomethacrylate, ethylene glycol diglycidyl ether, triethylene glycol diglycidyl ether or polyethylene glycol diglycidyl ether; or a reactive monomer having at least two unsaturated bonds in the molecule, such as divinylbenzene, divinyltoluene, divinyl ether, diallyl maleinate; diallyl phthalate, ethylene glycol diacrylate or dimethacrylate, polyethylene glycol diacrylate or dimethacrylate, trimethylene glycol diacrylate or dimethacrylate or trimethylolpropane trimethacrylate. The amount of these monomers used are naturally limited in order to keep the copolymer of this invention water-soluble.

The water-soluble copolymers of this invention are a copolymer of the monomer A and the monomer B as previously mentioned. To achieve the purpose of this invention, it is preferable that the monomer A be contained in an amount by weight of 0.1–50%, of the total of the monomers A and B in the copolymer. In other words, it is preferable that the copolymer contain 0.1–50% by weight of the monomer A and 50–99.9% by weight of the monomer B since the use of the above proportions will be excellently effective in achieving the purpose of this invention.

Furthermore, to attain the purpose of this invention in a more excellent mode, it is more preferable to use as the monomer B at least 60% by weight, based on the total of the monomers A and B, of at least one water-soluble monomer selected from acrylic acid, methacrylic acid, maleic acid, fumaric acid, acrylamide, diacetoneacrylamide, methallylsulfonic acid, styrenesulfonic acid, 2-hydroxyethyl acrylate, methyl vinyl ether, vinylpyrrolidone, dimethylaminoethyl methacrylate, polyethylene glycol monomethacrylate and the like. Those which are particularly preferable among said water-soluble monomers, are, α,β-ethylenically unsaturated carboxylic acids such as acrylic, methacrylic, maleic acid itaconic acids. The carboxyl group of groups of these, α,β-ethylenically unsaturated carboxylic acid may partly or wholly take a form of monovalent cation salt, and this form is preferred since it is more water-soluble. Examples of such salts are alkali metal salts (such as lithium, sodium and potassium salts), ammonium salts and amine salts (such as methylamine and diethanolamine salts).

The water-soluble copolymers of this invention may be easily obtained by a general method for polymerization vinylic monomers.

For example, the monomers A and B are copolymerized in water at 50°–150° C. for 1–10 hours in the presence of a water-soluble persulfate, such as potassium persulphate, in an amount by weight of 0.1–10% of the total of the monomers, after which the reaction mixture is adjusted in pH (to a suitable pH of 7–8 for example) with the use of caustic alkali or ammonia water thereby easily obtaining the copolymer.

The copolymer of this invention so obtained is a colorless or light yellow aqueous solution or a water-soluble solid copolymer. To achieve the purpose of this invention, the water-soluble copolymer of this invention is required to have dispersion and chelation effects and, therefore, it is preferably a copolymer having a low molecular weight. Thus, it is preferable that the copolymer will have a viscosity of not higher than 2,000 centipoise (Brookfield rotational type viscosimeter, 25° C., 60 rpm) when the copolymer is made to be in the form of a 40 wt.% aqueous solution thereof.

Unlike the various polymers used in the conventional water treating compositions, the thus obtained water-soluble copolymer will, per se, exhibit surprising effects, such as prevention and inhibition of corrosion, scale formation, sludge deposition and dirtying, without the combined use of a "corrosion preventing/inhibiting agent", that is, without containing the ingredients, which are a source of environmental pollution as secondary public harm, in accordance with this invention.

The water-soluble copolymers of this invention are, per se, very useful as a water treating agent. However, depending on the kind of water to be treated and the water treating performance to be required, said polymers may be incorporated with a known conventionally-used corrosion preventing/inhibiting agent for iron or steel, corrosion preventing/inhibiting agent for copper, copper alloy and other metals, agent for inhibiting scale formation, sludge deposition and dirtying, and metal ion chelating agent. These agents to be incorporated may be used singly or in combination depending on the purpose and use. The conventional corrosion preventing/inhibiting agents include inorganic salts such as chromates, bichromtes, tungstates, molybdates, nitrites, borates, silicates and phosphates; organic compounds such as oxycarbonates, amino acids, catechol, aliphatic amines, phosphonates, phosphoric esters, sorbitol, other polysaccharide salts and derivatives thereof; various surface-active agents; and heterocyclic compounds such as benzotriazole and mercaptobenzothiazole.

The conventional agents for preventing and inhibiting scale formation, sludge deposition and dirtying, include lignin derivatives, tannates, polysaccharides such as starch and derivatives thereof, sodium polyacrylate, partial hydrolysates of polyacrylic acid amide and acrylic acid hydroxyethyl methacrylate-acrylic acid copolymers.

The conventional metal ion chelating agents include polyamines such as ethylenediamine and diethylenetriamine; and polyaminocarboxylates such as nitrilotriacetate, ethylenediaminetetraacetate and triethylenetriaminepentaacetate.

The water-soluble copolymers of this invention will exhibit further better effects when they are used in combination with the conventional "corrosion preventing/inhibiting agent", however, it is preferable in this case that said conventional agents be used in such limited amounts that they do not spoil the feature (absence of the ingredients causing environmental pollution as secondary public harm) of this invention.

The concentration of the water-soluble copolymer of this invention in water to be treated when it is used alone (without the conventional corrosion preventing/inhibiting agent) as the water treating agent, will vary depending on the calcium hardness, M-alkalinity, pH, temperature and the like of water to be treated and it should be determined in view of the properties of the water to be treated and the condition of the use of the resulting treated water. The copolymer of this invention is used in a concentration of usually 0.5–1,000 p.p.m., preferably 50–200 p.p.m. in the to-be-treated water. In addition, when the water-soluble copolymer of this invention is used in combination with the corrosion preventing/inhibiting agent, it is used in a concentration of 0.1–500 p.p.m., preferably 5–50 p.p.m. in order to enable it to have satisfactory effects on the prevention and inhibition of scale formation, sludge deposition, dirtying and the like. The concentration of the conventional corrosion preventing/inhibiting agent used in the to-be-treated water may be the same 1–100 p.p.m. as conventionally used.

The use of the water treating composition of this invention eliminates the drawback that the conventional known water treating agents are decomposed due to the reaction of the carbonates, phosphates and metal salts therein caused by heat or the like thereby rendering it difficult to keep the concentration of the water treating composition at a necessary effective one. Further, even when the water treating composition of this invention is used in a water system in which the hardness and pH are high or in a water system in which the water temperature varies (although the conventional water treating compositions are little effective and difficult to apply in such water systems), it is able to eliminate the aforesaid drawback, improve the corrosion preventing effect, and prevent and inhibit scale formation, sludge deposition and dirtying. The reason for this would be that, without being influenced by the salts in the water and the temperature thereof, the water-soluble copolymer of this invention permits the water treating agent to keep its necessary effective concentration to eliminate the drawback mentioned above whereby further satisfactory corrosion preventing effects are exhibited.

The water-soluble copolymer of this invention, as previously mentioned, will exhibit satisfactory effects on the prevention and inhibition of corrosion, scale formation, sludge deposition and dirtying even when it is used alone as the water treating composition, and, further, it does not contain phosphorus as is clearly indicated by the structural formula. Thus, even when the used water to which the copolymer of this invention has been made, is discharged from the water system to lakes, swamps, rivers, oceans and the like, the used water so discharged will not cause environmental pollution, that is the eutraphication, as secondary public harm. This feature has not been appreciated from the known water treating compositions and, therefore, the water treating composition of this invention is a novel excellent one which is now eagerly sought for.

This invention will be better understood by the following Examples and Comparative Examples.

EXAMPLES 1-18 AND COMPARATIVE EXAMPLES 1-13

There were produced water-soluble copolymers A, B and C according to this invention which had properties as shown in Table 1. These copolymers were produced by the use of a known method as detailed below.

Preparation of the water-soluble copolymer A

One hundred and forty (140) grams of isopropyl alcohol and 166 g of ion exchanged water were charged into a one-liter four-necked flask provided with a thermometer, agitator and reflux condenser to form a mixture which was then heated to 82° C. under agitation at atmospheric pressure. The mixture so heated was incorporated under agitation with a mixture of 140 g of acrylic acid as the monomer B and 60 g of monomer X as the monomer A, and 60 g of a 10% aqueous solution of ammonium persulfate as the polymerization catalyst by continuously adding these three materials dropwise respectively through different nozzles to said heated mixture over a time length of 4 hours to effect a copolymerizing reaction. After the end of addition of said three materials, the reaction system was maintained at 82° C. under agitation for one hour to complete the polymerizing reaction. The resulting reaction mixture was heated to 60°-70° C. under vacuum to distill off the whole (140 g) of the isopropyl alcohol. Thereafter the thus obtained alcohol-free reaction mixture was incorporated with 158.8 g of a 49% solution of NaOH at such an incorporating rate that the temperature of the reaction mixture was not raised beyond 70° C. to neutralize the reaction mixture, incorporated with 45 g of ion exchange water for adjusting the solid matter content and then cooled to room temperature (25° C.) thereby to obtain the water-soluble copolymer A. The properties of copolymer A is shown in Table 1.

Preparation of the water-soluble copolymer B

The procedure for preparing the copolymer A was followed except for the use of 30 g of monomer Y as the monomer A, 130 g of acrylic acid, 20 g of itaconic acid and 20 g of butyl acrylate as the monomer B, 172.6 g of a 49% solution of NaOH for neutralization and 32.8 g of ion exchange water for adjusting the solid matter content, thereby to obtain the water-soluble copolymer B.

Preparation of the water-soluble copolymer C

The procedure for preparing the water-soluble copolymer A was followed except for the use of 4 g of monomer Z as the monomer A, 120 g of acrylic acid, 32 g of maleic anhydride, 4 g of styrene and 40 g of methyl methacrylate as the monomer B, 189.4 g of a 49% solution of NaOH for neutralization and 35.8 g of ion exchange water for adjusting the solid matter content, thereby to obtain the water-soluble copolymer C. As shown in Table 4, there were then provided water treating compositions comprising only the thus produced copolymer, novel ones comprising both the thus produced copolymer and a corrosion preventing/inhibiting agent and conventional ones excluding said water-soluble copolymers. The water treating compositions so provided were each tested for their performance or effect by the use of a model apparatus having an open-type recycling cooling water system wherein a heat exchanger and cooling tower were arranged. The specification of the model apparatus is as follows:

| Specification of Model Apparatus | |
|---|---|
| 1. Heat exchanger Heat conducting area | 2,200 cm$^2$ |
| Test tubes  for testing corrosion | S.T.B.-35 2 tubes |
| for testing scale formation and dirtying | S.U.S.-304 2 tubes |
| 2. Amount of water held | 500 l |
| 3. Amount of heat conducted | 45,000 Kcal/m$^2$/hr |
| 4. Recycling water Flow rate | 0.2 m/sec. |
| Water temperature at inlet (Heat exchanger) | 30-33° C. |
| Water temperature at outlet (Heat exchanger) | 50-55° C. |

In the test using the model apparatus of the above specification, the operation thereof was performed under the following conditions:

The recycled cooling water was passed through the shell side, while steam for heating was passed through the inside of the tubes countercurrently with the cooling water; the city water of Osaka City was supplied as said cooling water (the water analysis of the city water being as indicated in Table 2); and the water treating composition was added continuously in fixed amounts to the cooling tower pit to keep the concentration of the effective ingredient or ingredients at a predetermined one.

The amount of scale attached to the S.U.S.-304 tubes provided as the heat exchanger tubes was weighed to find the scale attaching rate (or speed). In addition, the S.T.B.-35 tubes as well as mild steel test pieces immersed in the return piping (in the model apparatus) for cooling water were tested for corrosion. Thereafter, the S.T.B.-35 tubes and the mild steel test pieces (JIS SS41) were weighed to find the corrosion rate thereby evaluating the effect of this invention.

TABLE 1

| Water-soluble copolymer | Water-Soluble Copolymer | | Properties | | |
|---|---|---|---|---|---|
| | Monomer component (wt. %) | | Solid matter (%) | Viscosity CPS 25° C. | pH |
| | Monomer A | Monomer B | | | |
| A | X 30 | AA 70 | 40 | 600 | 7.5 |
| B | Y 15 | AA, ITA, BA 65 10 10 | 40 | 750 | 7.8 |
| C | Z 2 | AA, MIA, ST, MMA 60 16 2 20 | 40 | 880 | 8.1 |

X Butylglycidyl ether:acrylic acid = 1:1.1 mol addition reaction product
Y Phenylglycidyl ether:methacrylic acid = 1:1.1 mol addition reaction product
Z Propionic acid glycidyl ester:acrylic acid = 1:1.1 mol addition reaction product
AA Acrylic acid
ITA Itaconic acid
BA Butyl acrylate
MIA Maleic acid
ST Styrene
MMA Methyl methacrylate

TABLE 2

| City Water of Osaka City | |
|---|---|
| Electric conductivity (μs/cm) | 150–190 |
| pH | 6.7–7.2 |
| M. Alkalinity (as CaCO3) | 37–43 ppm |
| Ca-hardness (as CaCO3) | 35–40 ppm |
| Chlorine ion | 18–22 ppm |
| Sulfate ion | 24–28 ppm |
| Silica | 10–11 ppm |

TABLE 3

| Water Analysis of Recycled Cooling Water | |
|---|---|
| Electric conductivity (μs/cm) | 700–1,000 |
| pH | 8.8–9.0 |
| M. Alkalinity (as CaCO3) | 300–350 ppm |
| Ca-hardness (as CaCO3) | 300–350 ppm |
| Chlorine ion | 150–200 ppm |

The initial treatment on the first day of operation is as indicated in Table 4. Each of the agents was added so that the initial treating concentration thereof was obtained as shown in Table 4, thereafter forced blowdown was carried out to lower the initial treating concentration of the agent to less than about one half (½) of the initial concentration and then the heating operation was carried out to control and adjust the amount of the agents added so that the standing concentration indicated in Table 4 was obtained, after which the operation was continuously carried out while adjusting concentration recycling and the amount of blowdown, to allow the recycled cooling water to have a water analysis as shown in Table 3. After the end of successive 30 days' operation test, the corrosion rate and scale attaching rate were measured with the results being shown in Table 4.

It seen from Table 4 that the water treating compositions containing the water-soluble copolymer of this invention have remarkably excellent preventability of scale attachment and preventability of corrosion as compared with those (Comparative Examples) containing none of the water-soluble copolymers of this invention.

TABLE 4

Water Treating Composition and Their Effects

| Comparative Example | Water treating composition | Initial-treating conc. ppm | Standing conc. ppm | Scale attaching rate M.C.M. | Corrosion rate M.D.D. |
|---|---|---|---|---|---|
| 1 | None of effective agents | — | — | 196.5 | 207.8 |
| 2 | Sodium hexametaphosphate | 100 | 25 | 157.1 | 118.2 |
|   | Anhydrous zinc sulfate | 100 | 25 | | |
| 3 | Sodium hexametaphosphate | 100 | 20 | 96.3 | 94.6 |
|   | Anhydrous zinc sulfate | 100 | 20 | | |
|   | Sodium polyacrylate | 200 | 20 | | |
| 4 | Hydroxyethylenephosphonic acid | 100 | 50 | 33.0 | 67.3 |
|   | Sodium polyacrylate | 100 | 50 | | |
| 5 | Hydroxyethylenephosphonic acid | 120 | 60 | 59.1 | 39.4 |
|   | Anhydrous zinc sulfate | 20 | 10 | | |
|   | 2-(ε-aminobenzyl)-benzimidazole | 20 | 10 | | |
| 6 | Hydroxyethylenephosphonic acid | 60 | 30 | 45.5 | 31.6 |
|   | Anhydrous zinc sulfate | 20 | 10 | | |
|   | 2-(ε-aminobenzyl)-benzimidazole | 20 | 10 | | |
|   | Sodium polyacrylate | 60 | 30 | | |
| 7 | 2-Phosphonobutane-1,2,4-tricarboxylic acid | 120 | 60 | 61.2 | 37.1 |
|   | Anhydrous zinc sulfate | 20 | 10 | | |
|   | 2-(ε-aminobenzyl)-benzimidazole | 20 | 10 | | |
| 8 | 2-Phosphonobutane-1,2,4-tricarboxylic acid | 60 | 30 | 53.3 | 28.6 |
|   | Anhydrous zinc sulfate | 20 | 10 | | |
|   | 2-(ε-aminobenzyl)-benzimidazole | 20 | 10 | | |
|   | Sodium polyacrylate | 60 | 30 | | |
| 9 | 2-Phosphonobutane-1,2,4-tricarboxylic acid | 100 | 50 | 35.5 | 26.2 |
|   | Sodium polyacrylate | 100 | 50 | | |
| 10 | Sodium acrylate/2-hydroxypropyl acrylate copolymer | 200 | 100 | 8.2 | 248.5 |
| 11 | Sodium acrylate/2-hydroxypropyl acrylate copolymer | 200 | 50 | 6.4 | 236.3 |
| 12 | Sodium acrylate/2-hydroxyethyl methacrylate/methyl acrylate copolymer | 200 | 100 | 5.6 | 229.8 |
| 13 | Sodium acrylate/2-hydroxyethyl methacrylate/methyl acrylate | 200 | 50 | 9.3 | 237.1 |

TABLE 4-continued
Water Treating Composition and Their Effects
copolymer

| Example | Water treating composition | Initial-treating conc. ppm | Standing conc. ppm | Scale attaching rate M.C.M. | Corrosion rate M.D.D. |
|---|---|---|---|---|---|
| 1 | Water-soluble copolymer A | 200 | 100 | 5.0 | 10.8 |
| 2 | Water-soluble copolymer A | 200 | 50 | 7.2 | 13.1 |
| 3 | Water-soluble copolymer B | 200 | 100 | 6.2 | 9.4 |
| 4 | Water-soluble copolymer B | 200 | 50 | 9.9 | 12.7 |
| 5 | Water-soluble copolymer C | 200 | 100 | 7.1 | 7.1 |
| 6 | Water-soluble copolymer C | 200 | 50 | 9.8 | 10.8 |
| 7 | Sodium hexametaphosphate | 40 | 20 | 11.4 | 13.4 |
|   | Anhydrous zinc sulfate | 40 | 20 | | |
|   | Water-soluble copolymer A | 40 | 20 | | |
| 8 | Sodium hexametaphosphate | 40 | 20 | 15.1 | 11.6 |
|   | Anhydrous zinc sulfate | 40 | 20 | | |
|   | Water-soluble copolymer B | 40 | 20 | | |
| 9 | Sodium hexametaphosphate | 40 | 20 | 19.2 | 9.3 |
|   | Anhydrous zinc sulfate | 40 | 20 | | |
|   | Water-soluble copolymer C | 40 | 20 | | |
| 10 | Hydroxyethylidenephosphonic acid | 60 | 30 | 9.9 | 11.3 |
|   | Anhydrous zinc sulfate | 20 | 10 | | |
|   | 2-($\epsilon$-aminobenzyl)-benzimidazole | 20 | 10 | | |
|   | Water-soluble copolymer A | 60 | 30 | | |
| 11 | Hydroxyethylidenephosphonic acid | 60 | 30 | 10.8 | 9.7 |
|   | Anhydrous zinc sulfate | 20 | 10 | | |
|   | 2($\epsilon$-aminobenzyl)-benzimidazole | 20 | 10 | | |
|   | Water-soluble copolymer B | 60 | 30 | | |
| 12 | Hydroxyethylidenephosphonic acid | 60 | 30 | 12.9 | 7.1 |
|   | Anhydrous zinc sulfate | 20 | 10 | | |
|   | 2-($\epsilon$-aminobenzyl)-benzimidazole | 20 | 10 | | |
|   | Water-soluble copolymer C | 60 | 30 | | |
| 13 | Hydroxyethylidenephosphonic acid | 100 | 50 | 6.1 | 10.8 |
|   | Water-soluble copolymer A | 100 | 50 | | |
| 14 | Hydroxyethylidenephosphonic acid | 100 | 50 | 7.9 | 8.1 |
|   | Water-soluble copolymer B | 100 | 50 | | |
| 15 | Hydroxyethylidenephosphonic acid | 100 | 50 | 10.2 | 6.9 |
|   | Water-soluble copolymer C | 100 | 50 | | |
| 16 | 2-Phosphonobutane-1,2,4-tricarboxylic acid | 60 | 30 | 10.3 | 8.7 |
|   | Anhydrous zinc sulfate | 20 | 10 | | |
|   | 2-($\epsilon$-aminobenzyl)-benzimidazole | 20 | 10 | | |
|   | Water-soluble copolymer A | 60 | 30 | | |
| 17 | 2-Phosphonobutane-1,2,4-tricarboxylic acid | 60 | 30 | 14.5 | 6.8 |
|   | Anhydrous zinc sulfate | 20 | 10 | | |
|   | 2-($\epsilon$-aminobenzyl)-benzimidazole | 20 | 10 | | |
|   | Water-soluble copolymer B | 60 | 30 | | |

TABLE 4-continued

Water Treating Composition and Their Effects

| | | | | | |
|---|---|---|---|---|---|
| 18 | 2-Phosphonobutane-1,2,4-tricarboxylic acid | 60 | 30 | 17.3 | 5.1 |
| | Anhydrous zinc sulfate | 20 | 10 | | |
| | 2-(ε-aminobenzyl)-benzimidazole | 20 | 10 | | |
| | Water-soluble copolymer C | 60 | 30 | | |

Note:
M.C.M.: mg/cm$^2$ · month
M.D.D.: mg · dm$^2$ · day

What is claimed is:

1. A water treating composition comprising a water-soluble copolymer consisting of, as the components, (A) an addition reaction product of a glycidyl ether or glycidyl ester and an $\alpha,\beta$-ethylenically unsaturated carboxylic acid and (B) another vinyl monomer.

2. A water treating composition according to claim 1, wherein the glycidyl ether is a methylglycidyl ether, ethylglycidyl ether, butylglycidyl ether, 2-ethylhexylglycidyl ether, laurylglycidyl ether, butylmethaglycidyl ether, phenylglycidyl ether, phenylmethaglycidyl ether or allylglycidyl ether, and the glycidyl ester is acetic acid methaglycidyl ester, propionic acid glycidyl ester, benzoic acid glycidyl ester, lauric acid glycidyl ester or palmitic acid glycidyl ester.

3. A water treating composition according to claim 1, wherein the glicidyl ether is a butylglycidyl ether or phenylglycidyl ether.

4. A water treating composition according to claim 1, wherein the $\alpha,\beta$-ethylenically unsaturated carboxylic acid is acrylic acid, methacrylic acid, maleic acid or itaconic acid.

5. A water treating composition according to claim 1, wherein the $\alpha,\beta$-ethylenically unsaturated carboxylic acid is acrylic acid or methacrylic acid.

6. A water treating composition according to any one of claims 1–5 wherein the other vinyl monomer (B) is acrylic acid, methacrylic acid, maleic acid, itaconic acid, acrylamide, diacetoneacrylamide, methallylsulfonic acid, styrenesulfonic acid, 2-hydroxyethyl acrylate, methylvinyl ether, vinylpyrrolidone, dimethylaminoethyl methacrylate or polyethylene glycol monomethacrylate.

7. A water treating composition according to claim 6, wherein the other vinyl monomer (B) is acrylic acid, methacrylic acid, maleic acid or itaconic acid.

8. A water treating composition according to any one of claims 1–5, wherein the water-soluble copolymer consists of the addition reaction product (A) and the other vinyl monomer (B) in a ratio by weight of 0.1–50%:50–99.9%.

9. A water treating composition according to claim 8, wherein the ratio by weight of the addition reaction product (A) and the other vinyl monomer (B) is 0.1–40%:60–99.9%.

10. A water treating composition according to claim 6, wherein the water-soluble copolymer consists of the addition reaction product (A) and the other vinyl monomer (B) in a ratio by weight of 0.1–50%:50–99.9%.

11. A water treating composition according to claim 1, further comprising at least one conventional corrosion preventing/inhibiting agent.

12. A method for water treatment characterized by adding a water treating composition comprising a water-soluble copolymer consisting of, as the components, (A) an addition reaction product of a glycidyl ether or glycidyl ester and an $\alpha,\beta$-ethylenically unsaturated carboxylic acid and (B) another vinyl monomer, in a concentration of 0.5–1000 p.p.m. in water.

13. A method for water treatment according to claim 12, wherein the concentration of the water treating composition is 50–200 p.p.m.

14. A method for water treatment characterized by adding, in water, a conventional corrosion preventing/inhibiting agent in a concentration of 1–100 p.p.m. in combination with a water treating composition comprising a water-soluble copolymer consisting of, as the components, (A) an addition reaction product of a glycidyl ether or glycidyl ester and an $\alpha,\beta$-ethylenically unsaturated carboxylic acid and (B) another vinyl monomer, in a concentration of 0.1–500 p.p.m.

15. A method for water treatment according to claim 14, wherein the concentration of the water treating composition is 5–50 p.p.m.

* * * * *